(12) United States Patent
Erb et al.

(10) Patent No.: US 7,430,529 B2
(45) Date of Patent: Sep. 30, 2008

(54) SYSTEM FOR ACQUIRING RIGHTS TO LEASE WELL SERVICES

(75) Inventors: Kim Robert Erb, Houston, TX (US); Robert Richard Steven, Harleston (GB)

(73) Assignee: ODS Petrodata, Inc., Houston, TX (US)

(*) Notice: Subject to any disclaimer, the term of this patent is extended or adjusted under 35 U.S.C. 154(b) by 380 days.

(21) Appl. No.: 11/257,835

(22) Filed: Oct. 25, 2005

(65) Prior Publication Data
US 2007/0094368 A1    Apr. 26, 2007

(51) Int. Cl.
*G06F 17/30* (2006.01)

(52) U.S. Cl. .................................. 705/27; 705/26

(58) Field of Classification Search .................. 705/26, 705/27
See application file for complete search history.

(56) References Cited

U.S. PATENT DOCUMENTS

| | | | |
|---|---|---|---|
| 6,445,777 B1 * | 9/2002 | Clark | 379/88.13 |
| 6,560,565 B2 | 5/2003 | Roy et al. | |
| 6,711,565 B1 | 3/2004 | Subramaniam et al. | |
| 7,333,877 B2 | 2/2008 | Swaminathan et al. | |
| 2002/0049642 A1 * | 4/2002 | Moderegger et al. | 705/26 |
| 2002/0065759 A1 * | 5/2002 | Boies et al. | 705/37 |
| 2005/0177789 A1 | 8/2005 | Abbar et al. | 715/528 |

* cited by examiner

*Primary Examiner*—Robert M. Pond
(74) *Attorney, Agent, or Firm*—Buskop Law Group, PC.; Wendy Buskop (57) ABSTRACT

A system for acquiring rights to lease well services including leassee client devices, leassor client devices, and a database server system is disclosed. The leassee client devices and leassor client devices communicate with the database server system. The database server system maintains a catalog of well services available to potential leassees via their respective client devices and comprising information on the well services available for lease. The database server maintains information on leassors with well services for lease, and information on equipment used on well services for lease. The system allows leassees and leassors to request bids, formulate potential leassor distribution lists, and determine the best leasing conditions offered by the potential leassees. The system facilitates making an award to the potential leassor offering the best leasing conditions for the lease of well services most closely matching the formulated bid request.

18 Claims, 6 Drawing Sheets

SYSTEM FOR ACQUIRING RIGHTS TO LEASE WELL SERVICES

FIELD

The present embodiments relate to systems for acquiring rights to lease well services.

BACKGROUND

Traditionally, leases of well services involve a lessor creating a lease agreement with a lessee. In creating the lease relationship and lease agreement, the prospective leassee will generally require information regarding the well services from the leassor. At times, leassors may lack the time or expertise to fully monitor the well services that are being provided, with precision and regularity, thereby creating an inability for them to thoroughly inform the leassees of the information that they require.

Some leassors turn to management companies. However, these companies can be expensive, and there are no assurances that payments to the leassor will be made when the payments are due. Additionally, these property management companies can lack the resources and expertise to provide the requisite information that a potential leassee requires before leasing well services.

Accordingly, there exists a need for a system for acquiring rights to lease well services for a specified period of time or a particular activity.

A potential leassee and leassor will normally require certain information before actually leasing well services, such as the availability of the well services, any technical specifications regarding the well services, the number of bid requests a potential leassee will have, contract terms of the lease, the different types of rates for services offered by the leassor, and the different types of responsibilities the leassee and leassor will incur. The enormous amount of information that needs to transfer between the potential leassee and leassor increases the probability of delaying, misplacing, or forgetting a piece of information that would be vital to either party.

Thus, a need exists to provide a system for a plurality of potential leassees to obtain information regarding a plurality of well services. A need exists to provide a system for a plurality of leassors to obtain information regarding the potential leassees that wish to lease well services. Further, a need exists for a database server system to interface the needs of the potential leassee and the leassor in a manageable fashion.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the embodiments in detail, it is to be understood that the invention is not limited to the particular embodiments, and that the invention can be practiced or carried out in various ways.

The present embodiments of the invention are generally related to a system for acquiring rights to lease well services. Well services can include: paraffin removal, treatment of various earth formations around a well, such as rock formations around an oil well or gas well; washing sand within a bore well; well stimulation of various types; related well treatment processes; other similar services, and combinations thereof.

The system can be a network system which enables one or more leassees and leassors to connect to a secure server via a network using one or more leassee client devices and one or more leassor client devices. For example, a MicroSoft SQL server can be used as the secure server and the network can be: an Internet, a wide area network (WAN), a local area network (LAN), an Intranet, or a subscriber network. The system contemplates that the network can be a standard network or a fiber-optic network. The leassee client devices and the leassor client devices can use passwords, identification codes, or other types of code, such as a biometric identifier to permit secure and authenticated access to the secure server of the database server system. For example, a user can transmit an encrypted password to a secure server. Then, the secure server can authenticate the user's identification and level of permitted access. Subsequently, the secure server can permit access of the authenticated user, which can be a potential leassee, an existing leassee, a leassor, or a potential leassor.

The database server system includes a processor, with associated memory, a database storage in communication with the processor, and I/O ports in communication with the processor for communication with a network. The processor can be a commercially available Compaq or Hewlett Packard server or an equivalent. The database storage can be centralized or a distributed database storage system, which uses multiple storage devices having available, for example, 40 gigabytes of memory. The database storage maintains information on well services, including general information on the types of well services, length of well services provided, and well services owner information, including: well services owner's address, any contact people, maintenance or service history, etc. The database storage includes information on well services that can be provided, such as paraffin removal, treatment of various earth formations around the well, washing sand within a bore well, well stimulation of various types, related well treatment processes, and combinations thereof.

The database storage includes information on the equipment used in performing the well services, which can include: numbers and types of pumps, horsepower of pumps, cranes for lifting rig assemblies, pipe handling equipment, pipe make-up equipment, drilling tubulars, specifications for drill bits based on rock and ground formations, well stimulation equipment, other similar equipment used for providing well services, and combinations thereof. The database storage system includes information on leassors providing well services, which information includes: individual contact information, leassor company name, contacts within the company, regional information, contact address, phone numbers, fax numbers, and email addresses. The database storage system includes information on bid requests such as line item or service pricing; dates of execution of a bid; maintenance costs per day, or by project, or by type of equipment; and other bid matters relative to daily costs. The database storage includes information on tender offers for well service leases and information on awards that were made based on tender offers, as well. Tender offer information can include the offered support vessel's technical specifications and requirements, deficient equipment, and tender offer qualifications, which can include contract exceptions; Quality, Safety, Health, and Environment (QHSE) exceptions; insurance requirements; a schedule of responsibilities; and commercial rates.

Operationally, the database server system includes computer instructions on computer readable media enabling potential leassees to specify technical requirements for a desired well service using a leassee client device. The system includes: computer instructions for formulating a leassor distribution list by the potential leassee to receive an invitation to tender an offer. For example, the leassor distribution lists can include: a global marketing manager, a regional specific marketing manager, a country specific marketing manager, a well service specific marketing manager, a deep water marketing manager, a shallow water marketing manager, an international marketing manager, and a domestic marketing manager.

To formulate the list of potential leassors to receive an invitation to bid, a user can select from a list of well services which has a list of leassors associated with the particular well services. These leassors can be users of the database server system, or they can be listed leassors in the server system, who or which are not an authenticated user of the system A potential leassee can select the well services of interest and create a list with addresses and emails for contacting leassors of those selected well services. The leassee provides the leassor with a bid request developed by the leassee. The bid request can include, among other things, the technical specifications for the well services to be leased. In addition, the database server system has computer instructions for formulating a bid request and transmitting the bid request to each leassor on the leassor distribution list via their respective leassor client devices. These computer instructions involve communication and display of selections and options to the potential leassee on the leassee client device from the database server system. In addition, computer instructions involve back and forth communication, between the client device and the server system, to be used in the identification of the technical requirements and the well services for the development of the leassor distribution list and for the invitation to respond to the bid proposal.

Once a bid proposal is created by the leassee, computer instructions in the database server system enable leassors to use their respective leassor client devices to tender offers regarding the lease of well services, that are related to the bid request, back to the potential leassee. These tender offers are tracked from the leassor client device through the secure server of the database server system to the leassee. The tender offer is captured in the data storage of the database server system with additional computer instructions. The tender offers can be tracked by a leassor, a leassee, or an administrator of the system. In an embodiment, the tender offers can be tracked by date of uploading and date of downloading.

Other computer instructions resident within the database server system enable leassees to determine the best leasing conditions offered by the leassors; and, to award a contract to a leassor which offers the best leasing conditions that most closely matches the bid request. The computer instructions enable the saving, into database storage, of the information on the contract awarded, (termed "the award" herein). For example, the best leasing conditions can be determined by best commercial fit, technical fit, and rig availability based on the tender requirements.

The leassor client devices and leassee client devices can be computers. For example, these devices can be personal digital assistants (PDA), cellular phones with display and processing capabilities, laptops, Blackberrys™, interactive television devices, and similar interactive devices with display, two way transmissions, connectivity to the network, and processing capability. A satellite phone or similar communication tool adapted to communicate with the World Wide Web can be used. The database server system is in communication with these leassor client devices and leassee client devices via the World Wide Web, but the server can interact with these devices though a wide area network (WAN), a local area network (LAN), an Intranet, or through a subscriber network, as well.

The database server system maintains a network accessible secure qualifications bulletin board. This network accessible secure qualifications bulletin board enables potential leassors to provide information to a leassee and receive information from a leassee with their respective leassor client devices in an open format. Examples of information received from the leassee include: bid document alternatives, leassee bid document exceptions, or combinations thereof. In addition, the secure qualifications bulletin board can be used by leassors or leassees for clarifications of bid documents, requests for additional information on a bid proposals, or combinations thereof.

The network accessible secure qualifications bulletin board can be on a second database server connected to the database server system, or it can be resident on one server housing the database storage, the processor, and the bulletin board.

Alternatively, the server system with bulletin board can be located in part on a plurality of servers. The secure qualification bulletin board provides one-to-one communication while a secure information bulletin board provides one-to-one or one-to-many communication. The details of the secure qualifications bulletin board and the secure information bulletin board are provided in FIGS. 5 and 6, respectively A reporting and data storage module can be used with the database system and is resident on the initial server or another server in communication with the processor of the database storage system.

The reporting and data storage module acts to store, information which is developed in the communications of the database storage system. The reporting and data storage module can store initial bid requests, as well as communications on clarifications to the bid process. This module can be used for storage and to provide reports on negotiation communications occurring during the bid process as well as for storing final bid requests; subsequent, initial, and final tender offers; and summaries of a leassee's selection process for well services. The reporting and data storage module can contain computer instructions to perform one or more of the tasks in communication with the processor. The report from the data storage module can include, for example: commercial summaries outlined by issues or by well services for rig comparisons, technical summaries outlined by specifications or by well services for rig comparisons, evaluation histories, tender details, submission status, proposal status, and information captured by the bulletin boards.

For example, the secure qualifications bulletin board can include information for private negotiation and agreement of contract qualifications, such as: a list of operators with well services for drilling rig operations and corresponding existing and previous contract descriptions, type of well services equipment by operator, location of well services for drilling rig operations or sites by operator and contract, and other tender information.

The secure information bulletin board can include information for public or private clarification of tender-related issues, such as: clarification of the operator for a type of well services for a drilling rig operation, clarification on contract description for an operator of well services for a drilling rig operation, clarification on well services and rig type equipment and water depth, clarification on location of well services for a drilling rig operation for a particular operator, and additional tender information.

The leassee's bid request can communicate or link to a secure service website so that potential leassors can determine if there is interest in the bid and permit potential leassors to download information for their review. A bid request can be for one well service, or a group of well services.

The database server system is programmed and designed to permit a potential leassee to select service rates that are of interest for the well services to be leased. Indicated service or operation rates can be addressed by the leassor for well services operations. Examples of selected service or operating rates include: day rates, for example day rates for well services including well treatment and repair of an offshore oil well located in the Gulf of Mexico; lump sum rates for well services, and deficient/additional equipment lump sum rates for providing well services and meeting minimum specifications. Examples of day rates are: lump sum rates, standby rates, force majeure rates, waiting on weather rates, repair services rates, and combinations thereof.

The database server system is contemplated to have computer instructions which permit a leassor to indicate a list of deficient equipment with regard to a well service to keep a potential leassee apprised. Deficient equipment can include upgrades for a crane, well stimulation equipment upgrades, pipe handling equipment upgrades, and similar equipment.

The database server system can have computer instructions to permit a potential leassee to select a number of other elements to go into a bid proposal such as insurance requirements required by the leassor for well services operations, contract terms and conditions of a services contract, safety requirements for well services operations, and a schedule of responsibilities between leassor and leassee for well services operations.

The leassee can create a bid proposal which requests a tender offer on a turnkey basis. The bid proposal can address a well service owned or controlled by a group of leassors, or it can address a group of well services controlled by one leassor, who or which is controlled by a group of leassors.

The tender offer can be made by the leassor based on the bid proposal and negotiations concerning various terms of the bid proposal.

The database server system enables potential leassees to use their respective leassee client devices to make joint bid proposals, and enables leassors to make joint tender offers. Joint tender offers can be made by partners of a lease, partners of a field, or other consortia.

The database server system can include computer instructions, wherein a leassee has a specified time period for the leassor to reply to a tender offer, such as a week or a month.

The database server system can include computer instructions to edit or modify the distribution list for the invitation to bid, technical specifications for a bid; the initial or final bid request; if there is more than one bid request, then any and all responses to bid requests; and initial and final tender offers depending on negotiations and revisions.

Computer instructions to create the contract award can also be resident on the database server system as an artificial intelligence program, or as a fill-in-the-blank award contract that can be displayed on a client device of a leassee and, then, transmitted to the leassor and stored in the data storage of the database server system.

Figure 1:
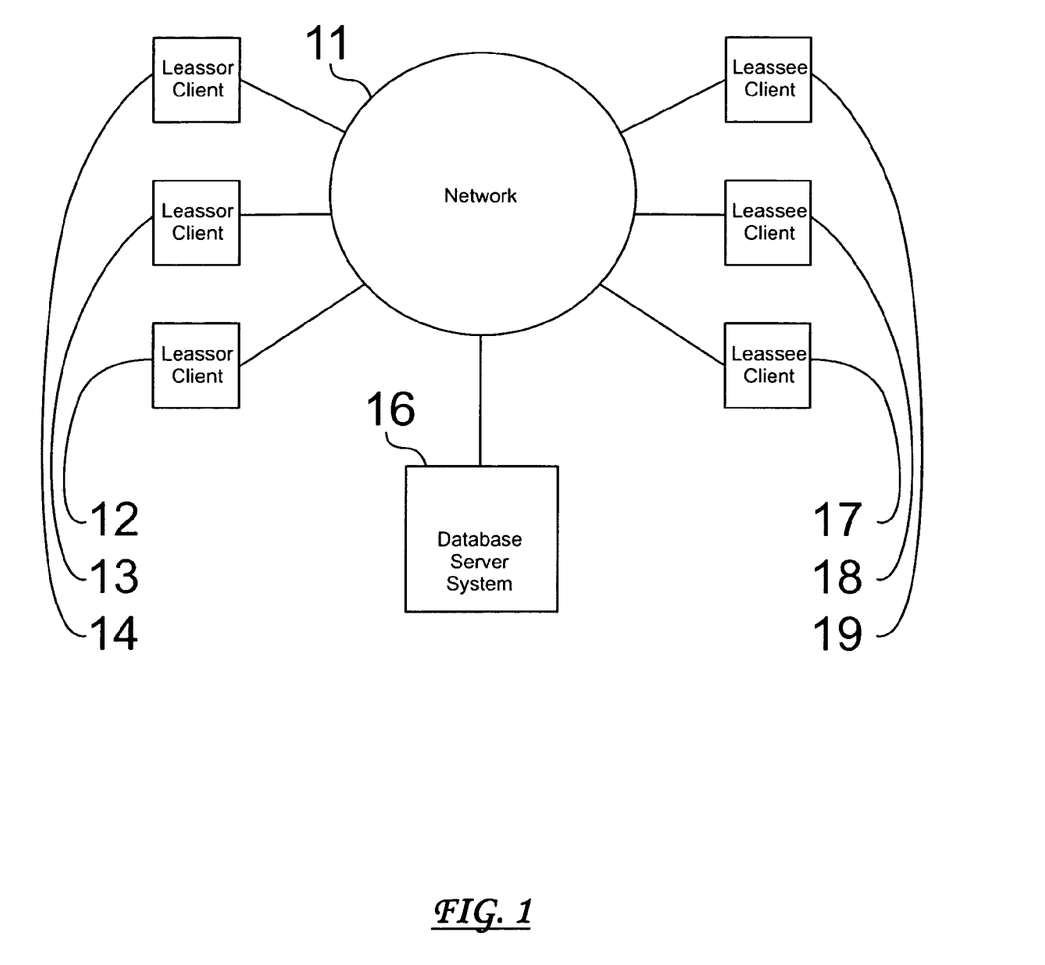
FIG. 1 depicts a diagram of a system for acquiring rights to lease well services.

With reference to the figures, FIG. 1, depicts a network (11) in communication with leassor client devices (12), (13), and (14), a database server system (16) and leassee client devices (17), (18) and (19). The network can be the Internet, and the client devices can be a combination of computers and PDA's, such as a Palm Pilot™ or a Dell PC computer.

Figure 2:
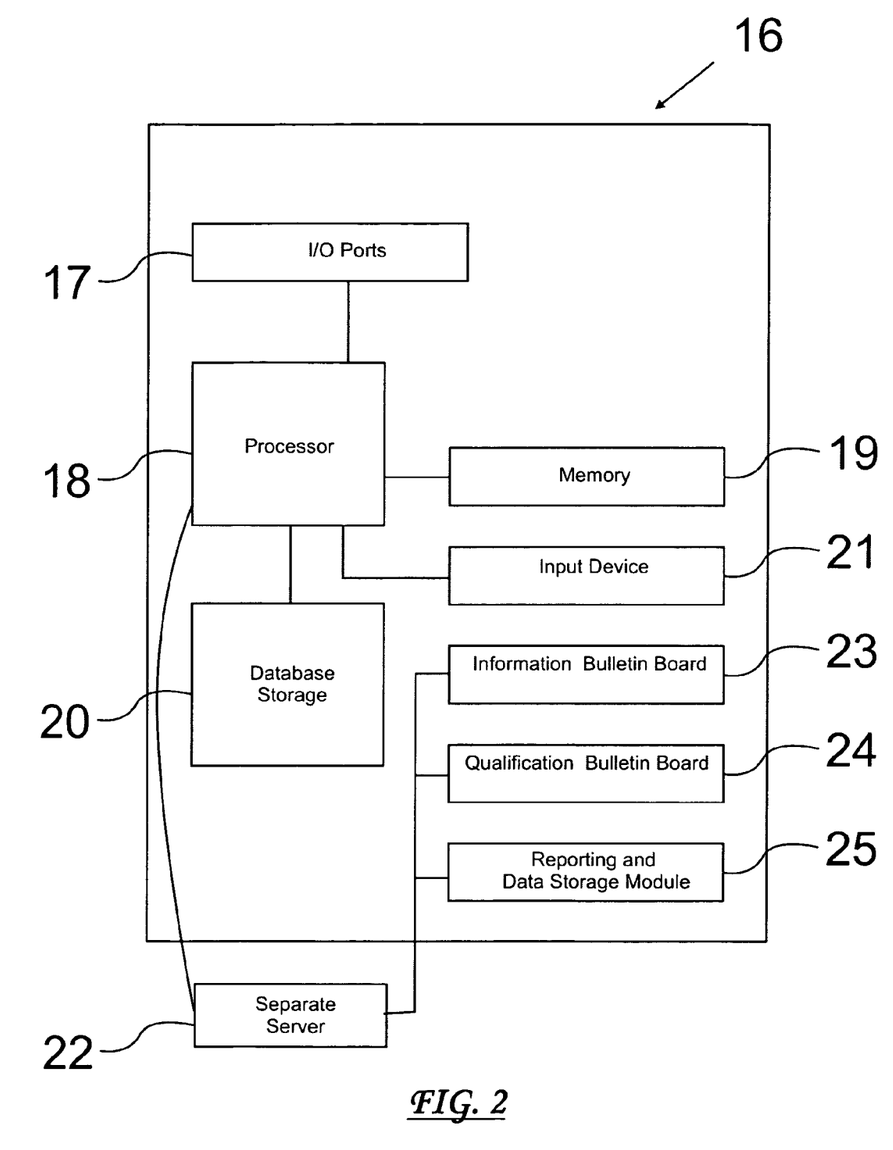
FIG. 2 depicts a diagram of the elements of a database server usable in a system to lease well services.

FIG. 2 depicts an embodiment of a database server system (16) which has I/O ports (17) for connecting to the network, and a processor (18) with memory (19), database storage (20), and an input device (21) for an administrator of the database server system. A separate server (22) can connect to the processor (18) for hosting an information bulletin board (23), a qualification bulletin board (24), and a reporting and data storage module (25). The database server system can include one database storage or multiple database storages.

Figure 3:
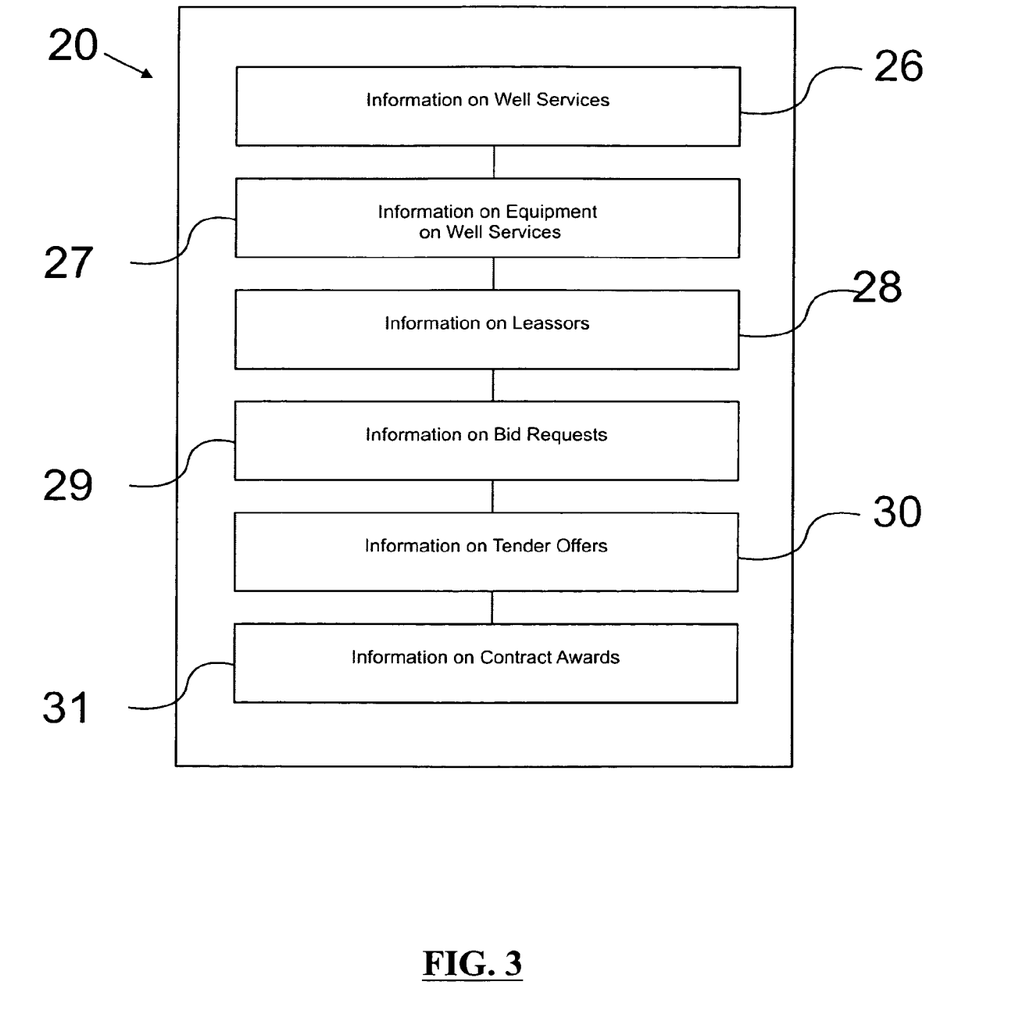
FIG. 3 depicts information in a data storage of an embodiment of a system for acquiring rights to lease well services.

FIG. 3 depicts information on a database storage device (20) which includes: information on well services (26), information on equipment for well services (27), information on leassors (28), information on bid requests (29), information on tender offers for well service leases (30), and information on contract awards based on tender offers for well service leases (31). The system contemplates that the information can be displaced over one database storage device or multiple database storage devices.

Figure 4:
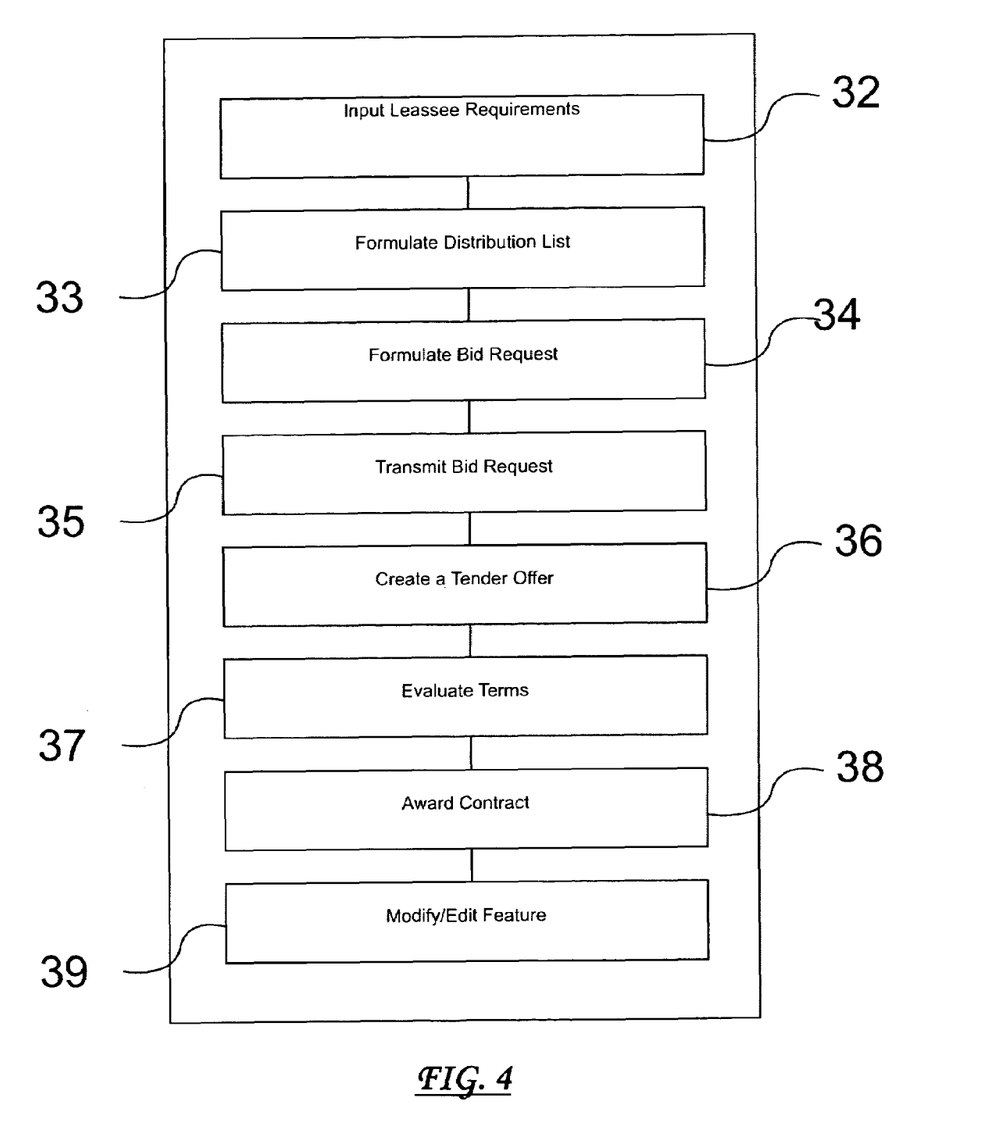
FIG. 4 depicts computer instructions usable in an embodiment of the a system to lease well services.

FIG. 4 depicts computer instructions of a computer readable media usable for a database server system for leasing well services. The computer instructions can be used for: enabling potential leassees to input leassee requirements for a desired well service (32) which can be on a client device and the server system; formulating a leassor distribution list by the potential leassee to receive an invitation to tender an offer (33); formulating a bid request (34), and transmitting the bid request to each leassor on the leassor distribution list via their respective leassor client devices (35), which is the invitation to develop a tender offer. Additionally, there are computer instructions enabling leassors to use their respective leassor client devices to create tender offers regarding the lease of well services related to the bid request (36); computer instructions for enabling leassees to determine the best leasing conditions offered by the leassors, which includes evaluating the terms (37); and finally computer instructions to make a contract award to a leassor (38) which offers the best leasing conditions that most closely matches the bid request. Additional computer instructions to edit or modify (39) the distribution list, technical specification, bid request, response to bid request, tender offer and final offer can be within the scope of the elements of the server system.

Figure 5:
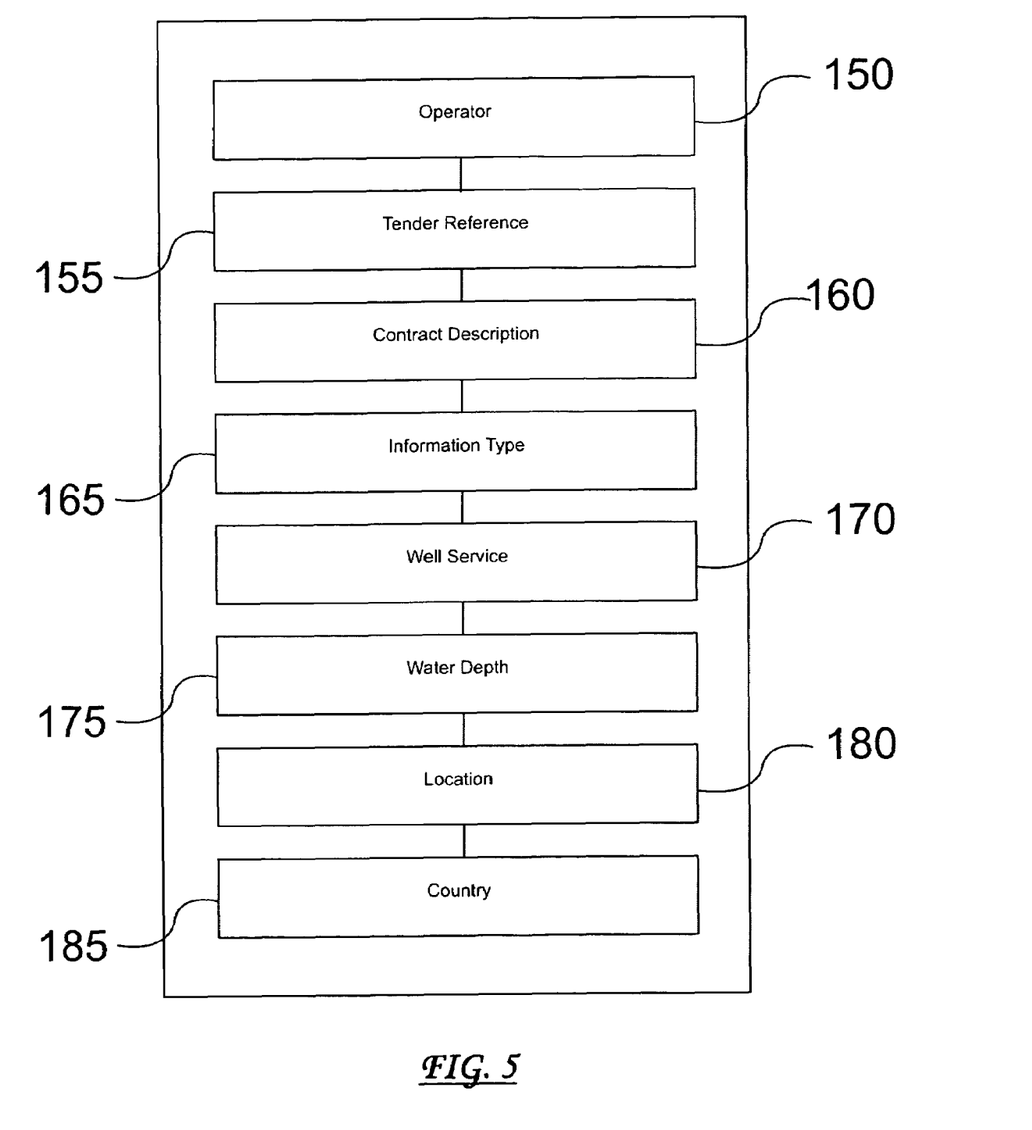
FIG. 5 depicts an embodiment of a secure qualifications bulletin board usable in a system for acquiring rights to lease well services.

FIG. 5 depicts an embodiment of a secure qualifications bulletin board usable in a system for acquiring rights to lease well services. A secure qualifications bulletin board can include information for private negotiation and agreement of contract qualifications. The information can begin with the name of the operator for well services operations (150), including the company name or owner of the well services equipment and well services operations. Next, a recording is made of: a tender information reference number (155) followed by a contract description, such as the length of the contract in years (160), and the type of information or offer, such as tender (165). Further, the secure qualifications bulletin board information includes well services type information, such as well stimulation (170) and water depth for available well services (175). The secure qualifications bulletin board information also includes the location for the well services operations or site (180) and the country in which the well services operations are being performed (185).

Figure 6:
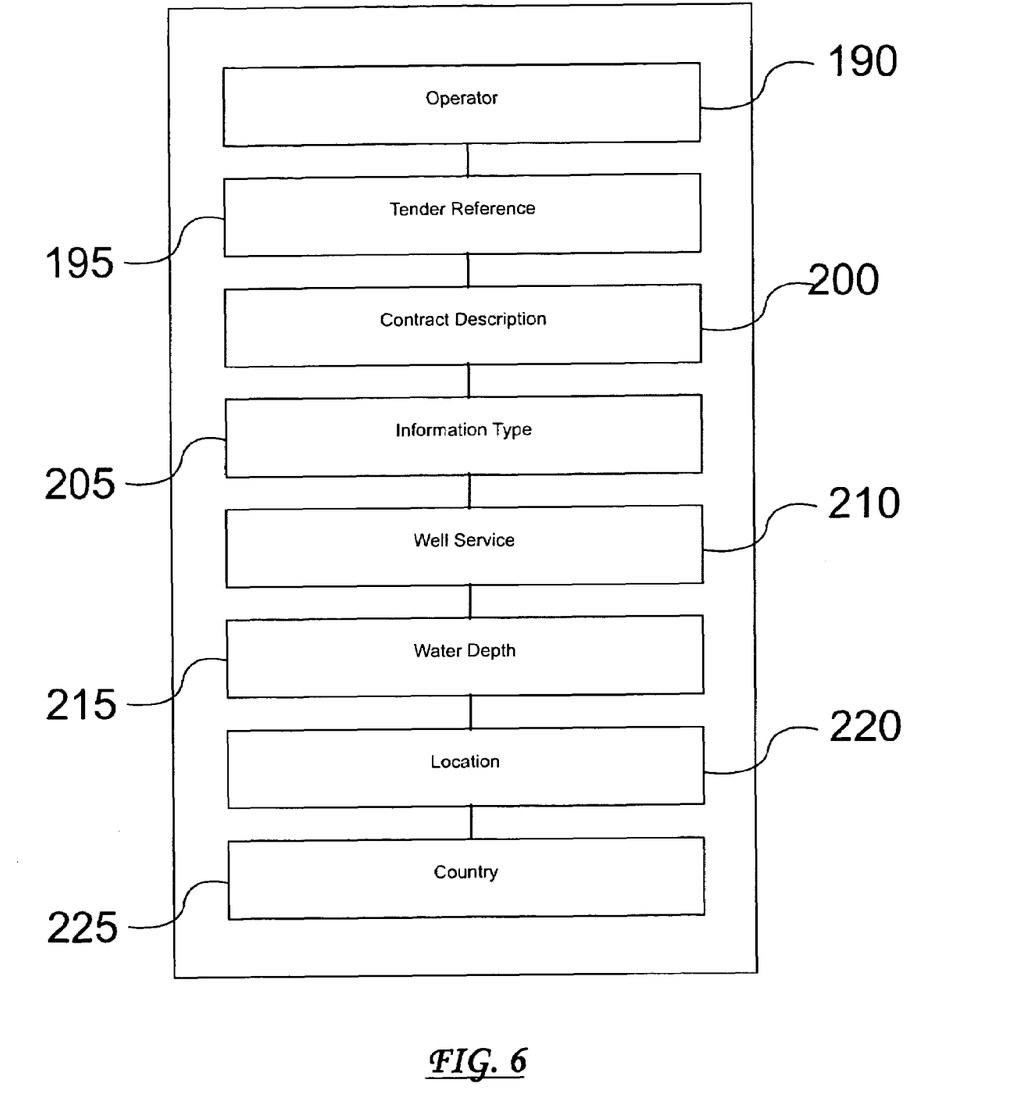
FIG. 6 depicts an embodiment of a secure information bulletin board usable in a system for acquiring rights to lease well services.

FIG. 6 depicts an embodiment of a secure information bulletin board usable in a system for acquiring rights to lease well services. The secure information bulletin board can include information for public or private clarification of tender-related issues. The secure information bulletin board information can include clarification of the name of the operator for a type of well service (190), the recording and clarification regarding a tender reference number (195), clarification with regard to the contract description for an operator for a well service operation (200), and clarification regarding the type of information or offer, such as tender (205). Other information on the secure bulletin board for clarification can include: well service type equipment (210), water depth for operations regarding well services (215), location of well service operations or site (220) and the country in which the well services operations are being performed (225).

While these embodiments have been described with emphasis on the embodiments, it can be understood that within the scope of the appended claims, the embodiments might be practiced other than as specifically described herein.

What is claimed is:

1. A system for acquiring rights to lease well services, wherein the system comprises:
   a. a leassee client device for use by a leassee of a well service;
   b. a leassor client device for use by a leassor of the well service; and
   c. a database server system communicating with the leassee client device and the leassor client device, wherein the database server system comprises a processor, a database storage in communication with the processor, I/O ports in communication with the processor for communication with a network, and wherein the database storage comprises:
      i. information on well services;
      ii. information on well service bid requests;
      iii. information on tender offers for well services leases; and
   wherein the database server system further comprises:
      i. computer instructions enabling potential leassees to specify technical requirements for desired well services comprising paraffin removal, treatment of various earth formations around a well, washing sand within a bore well, well stimulation of various types, workover well services, related well treatment processes, or combinations thereof, using a leassee client device, wherein the technical requirements comprise information on equipment used in providing well services, information on leassors with well services, information on awards based on tender offers, or combinations thereof;
      ii. computer instructions for formulating a leassor distribution list by the potential leassee to receive an invitation to tender;
      iii. computer instructions for formulating a bid request comprising the technical requirements and transmitting the bid request to each leassor on the leassor distribution list via their respective leassor client devices;
      iv. computer instructions enabling leassors to use their respective leassor client devices to tender offers comprising technical specifications regarding the lease of drilling rigs related to the bid request; and
      v. computer instructions for enabling leassees to automatically match multiple leasing conditions offered by the leassors including a best commercial fit, a best technical fit, and rig availability, based on the invitation to tender.

2. The system of claim 1, further comprising a network accessible secure qualifications bulletin board to enable leassors with their respective leassor client devices to provide information to the leassee and receive information from the leassee, wherein the information is selected from a member of the group consisting of: leassee bid document alternatives, leassee bid document exceptions, and combinations thereof.

3. The system of claim 2, wherein the network accessible secure qualifications bulletin board is on a second database server connected to the database server system.

4. The system of claim 2, wherein the network accessible secure qualifications bulletin board further comprises a reporting and data storage module.

5. The system of claim 4, wherein the reporting and data storage module comprises information developed in the system, wherein the information comprises a member selected from the group consisting of: initial bid requests, clarifications requested for the bid process, negotiation information developed during the bid process, final bid request, tender offers, summaries of a leassee's selection process for well services, and combinations thereof.

6. The system of claim 1, wherein the database server system further comprises computer instructions for making an award to the leassor which offers the multiple leasing conditions that most closely matches the bid request.

7. The system of claim 1, further comprising a network accessible secure information bulletin board to enable leassors to use their respective leassor client devices to request a member selected from the group consisting of: clarification of the bid request, additional information on the bid request, and combinations thereof, and to receive information, clarification, and combinations thereof from that network accessible secure bulletin board.

8. The system of claim 1, wherein the bid request comprises a link to a secure well services website for leassors to determine interest if the leassor has an interest in the bid request and to download information for review.

9. The system of claim 1, wherein the database server system permits the leassee to select operating rates to be addressed by the leassor for well services.

10. The system of claim 1, wherein the database server system permits the leassee to select a member from the group consisting of: insurance requirements required by the leassor regarding well service operations, safety requirements for well service operations, contract terms and conditions of a well services contract, a schedule of responsibilities between leassor and leassee for well services, and combinations thereof.

11. The system of claim 1, wherein the database server system permits the leassor to indicate a list of deficient equipment.

12. The system of claim 1, wherein the bid request addresses a plurality of well services.

13. The system of claim 1, wherein the database server system provides a specified time period for a leassor to reply to a tender offer.

14. The system of claim 1, wherein the database server system enables a plurality of leassees to use their respective leassee client devices to tender a joint offer regarding well services in a bid request.

15. The system of claim 1, wherein one or more of the leassor client devices and leassee client devices comprise a member selected from the group consisting of: a computer, a personal digital assistant, a cellular phone, a Blackberry™, a satellite phone, a similar communication tool adapted to communicate with the World Wide Web, and combinations thereof.

16. The system of claim 1, wherein the database server system is in communication with the leassee client devices and the leassor client devices using the World Wide Web.

17. The system of to claim 1, further comprising computer instructions to edit or modify a member selected from the group consisting of: the distribution list, technical specification, bid request, response to bid request, tender offer and final offer, and combination thereof.

18. The system of claim 1, wherein the equipment used to perform a well service comprises a member selected from the group consisting of: pumps, cranes, pipe handling equipment, pipes, drilling tubulars, tubular connectors, well stimulation equipment, similar equipment used for providing well services, and combinations thereof.

* * * * *